United States Patent

Kay et al.

[11] Patent Number: 6,031,474
[45] Date of Patent: Feb. 29, 2000

[54] HALF RATE CODED MODULATION SCHEMES FOR RAYLEIGH FADING CHANNELS

[76] Inventors: Stanley E. Kay, 15009 Flower Valley, Rockville, Md. 20853; Yezdi Antia, 8703 Tryal Ct., Gaithersburg, Md. 20879; Andrew J. Macdonald, 10929 Bellehaven Blvd., Damascus, Md. 20872

[21] Appl. No.: 09/038,367

[22] Filed: Mar. 10, 1998

[51] Int. Cl.[7] .................................................. H03M 7/00
[52] U.S. Cl. ........................... 341/106; 375/263; 714/759
[58] Field of Search ........................... 341/106; 375/263, 375/265, 280, 281; 714/759

[56] References Cited

U.S. PATENT DOCUMENTS

| | | | |
|---|---|---|---|
| 5,311,547 | 5/1994 | Wei | 375/18 |
| 5,448,592 | 9/1995 | Williams et al. | 375/263 |
| 5,659,578 | 8/1997 | Alamouti et al. | 375/261 |
| 5,784,417 | 7/1998 | Alamouti | 375/265 |

*Primary Examiner*—Howard L. Williams
*Attorney, Agent, or Firm*—John T. Whelan; Michael W. Sales

[57] ABSTRACT

A novel code and method of code construction is disclosed. The disclosed code is a half rate block code designed to function optimally in a Raleigh fading channel. The disclosed code and method may be implemented in an 8-ARY QPSK modulation system. An alternative embodiment is a code and method of code construction for use in a 16-ARY QPSK modulation system. Both codes are systematic and use four symbols to represent two symbols. The first two symbols of the code are the information symbols. The second two symbols are parity symbols. The parity symbols are selected to provide maximum Euclidean distance between code words.

5 Claims, 8 Drawing Sheets

| GROUP ROW | 0 | 1 | 2 | 3 | 4 | 5 | 6 | 7 |
|---|---|---|---|---|---|---|---|---|
| 0 | 0001 | 1030 | 2065 | 3017 | 4041 | 5072 | 6023 | 7054 |
| 1 | 0133 | 1162 | 2116 | 3145 | 4173 | 5221 | 6157 | 7100 |
| 2 | 0267 | 1211 | 2244 | 3276 | 4227 | 5253 | 6205 | 7232 |
| 3 | 0315 | 1343 | 2370 | 3324 | 4355 | 5307 | 6336 | 7361 |
| 4 | 0446 | 1477 | 2422 | 3450 | 4406 | 5435 | 6464 | 7413 |
| 5 | 0574 | 1525 | 2551 | 3502 | 4534 | 5566 | 6510 | 7547 |
| 6 | 0620 | 1656 | 2603 | 3631 | 4660 | 5614 | 6642 | 7675 |
| 7 | 0752 | 1704 | 2737 | 3763 | 4712 | 5740 | 6771 | 7726 |

FIG. 3

| GROUP ROW | 0 | 1 | 2 | 3 | 4 | 5 | 6 | 7 |
|---|---|---|---|---|---|---|---|---|
| 0 | 0 0 0 0 | 1 0 12 8 | 2 0 7 7 | 3 0 13 10 | 4 0 10 5 | 5 0 1 11 | 6 0 15 4 | 7 0 8 9 |
| 1 | 0 1 12 15 | 1 1 7 0 | 2 1 13 8 | 3 1 1 7 | 4 1 1 10 | 5 1 15 5 | 6 1 8 11 | 7 1 6 4 |
| 2 | 0 2 7 1 | 1 2 13 15 | 2 2 10 0 | 3 2 1 8 | 4 2 15 7 | 5 2 8 10 | 6 2 6 5 | 7 2 11 11 |
| 3 | 0 3 13 14 | 1 3 10 1 | 2 3 11 5 | 3 3 15 0 | 4 3 8 8 | 5 3 6 7 | 6 3 11 10 | 7 3 5 5 |
| 4 | 0 4 10 3 | 1 4 1 14 | 2 4 15 1 | 3 3 15 0 | 4 4 6 0 | 5 4 11 8 | 6 4 5 7 | 7 4 2 10 |
| 5 | 0 5 1 12 | 1 5 15 3 | 2 5 8 14 | 3 5 6 1 | 4 5 11 15 | 5 5 5 0 | 6 5 2 8 | 7 5 9 7 |
| 6 | 0 6 15 2 | 1 6 8 12 | 2 6 6 3 | 3 6 11 14 | 4 6 5 1 | 5 6 2 15 | 6 6 9 0 | 7 6 4 8 |
| 7 | 0 7 8 13 | 1 7 6 2 | 2 7 11 12 | 3 7 5 3 | 4 7 2 14 | 5 7 9 1 | 6 7 4 15 | 7 7 3 0 |
| 8 | 0 8 6 6 | 1 8 11 13 | 2 8 5 2 | 3 8 2 12 | 4 8 9 3 | 5 8 4 14 | 6 8 3 1 | 7 8 14 15 |
| 9 | 0 9 11 9 | 1 9 5 6 | 2 9 2 13 | 3 9 9 2 | 4 9 4 12 | 5 9 3 3 | 6 9 14 14 | 7 9 0 1 |
| 10 | 0 10 5 4 | 1 10 2 9 | 2 10 9 6 | 3 10 4 13 | 4 10 3 2 | 5 10 14 14 | 6 10 0 3 | 7 10 12 14 |
| 11 | 0 11 2 11 | 1 11 9 4 | 2 11 4 9 | 3 11 3 6 | 4 11 14 13 | 5 11 14 13 | 6 11 10 2 | 7 11 12 12 |
| 12 | 0 12 9 5 | 1 12 4 11 | 2 12 3 4 | 3 12 14 9 | 4 12 0 6 | 5 12 12 13 | 6 12 7 2 | 7 12 13 12 |
| 13 | 0 13 4 10 | 1 13 3 5 | 2 13 14 11 | 3 13 0 4 | 4 13 12 9 | 5 13 7 6 | 6 13 13 13 | 7 13 10 2 |
| 14 | 0 14 3 7 | 1 14 14 10 | 2 14 0 5 | 3 14 12 11 | 4 14 7 4 | 5 14 13 9 | 6 14 10 6 | 7 14 1 13 |
| 15 | 0 15 14 8 | 1 15 0 7 | 2 15 12 10 | 3 15 7 5 | 4 15 13 11 | 5 15 10 4 | 6 15 1 9 | 7 15 15 6 |

FIG. 6A

| GROUP ROW | 8 | 9 | 10 | 11 | 12 | 13 | 14 | 15 |
|---|---|---|---|---|---|---|---|---|
| 0 | 8 0 6 13 | 9 0 11 2 | 10 0 5 12 | 11 0 2 3 | 12 0 9 14 | 13 0 4 1 | 14 0 3 15 | 15 0 14 0 |
| 1 | 8 1 11 6 | 9 1 5 13 | 10 1 2 2 | 11 1 9 12 | 12 1 14 3 | 13 1 3 14 | 14 1 14 1 | 15 1 0 15 |
| 2 | 8 2 5 9 | 9 2 2 6 | 10 2 9 13 | 11 2 4 2 | 12 2 3 12 | 13 2 14 3 | 14 2 0 14 | 15 2 12 1 |
| 3 | 8 3 2 4 | 9 3 9 9 | 10 3 4 6 | 11 3 3 13 | 12 3 1 42 | 13 3 0 12 | 14 3 12 3 | 15 3 7 14 |
| 4 | 8 4 9 11 | 9 4 4 4 | 10 4 3 9 | 11 4 14 6 | 12 4 0 13 | 13 4 12 2 | 14 4 7 12 | 15 4 1 33 |
| 5 | 8 5 4 5 | 9 5 3 11 | 10 5 14 4 | 11 5 0 9 | 12 5 12 6 | 13 5 7 13 | 14 4 13 2 | 15 5 10 12 |
| 6 | 8 6 3 10 | 9 6 14 15 | 10 6 0 11 | 11 6 12 4 | 12 6 7 9 | 13 6 13 6 | 14 6 10 13 | 15 6 12 |
| 7 | 8 7 14 7 | 9 7 0 10 | 10 7 12 5 | 11 7 7 11 | 12 7 13 4 | 13 7 10 9 | 14 7 1 6 | 15 7 15 13 |
| 8 | 8 8 0 8 | 9 8 12 7 | 10 8 7 10 | 11 8 13 5 | 12 8 10 11 | 13 8 1 4 | 14 8 15 9 | 15 8 8 6 |
| 9 | 8 9 12 0 | 9 9 7 8 | 10 9 13 7 | 11 9 10 10 | 12 9 1 5 | 13 9 15 11 | 14 9 8 4 | 15 9 6 9 |
| 10 | 8 10 7 15 | 9 10 13 0 | 10 10 10 8 | 11 11 15 8 | 12 11 15 10 | 13 10 8 5 | 14 10 6 11 | 15 10 11 4 |
| 11 | 8 11 13 1 | 9 11 10 15 | 10 11 1 10 | 11 11 15 8 | 12 11 8 7 | 13 11 6 10 | 14 11 11 15 | 15 11 5 11 |
| 12 | 8 12 10 14 | 9 12 1 1 | 10 12 15 15 | 11 12 8 0 | 12 12 6 8 | 13 12 11 7 | 14 12 5 10 | 15 12 2 5 |
| 13 | 8 13 1 3 | 9 13 15 14 | 10 13 8 1 | 11 13 6 15 | 12 13 11 0 | 13 13 5 8 | 14 13 2 7 | 15 13 9 10 |
| 14 | 8 14 15 12 | 9 14 8 3 | 10 14 6 14 | 11 14 11 1 | 12 14 5 15 | 13 14 2 0 | 14 14 9 8 | 15 14 4 7 |
| 15 | 8 15 8 2 | 9 15 6 12 | 10 15 11 3 | 11 15 5 14 | 12 15 2 1 | 13 15 9 15 | 14 15 4 0 | 15 15 3 8 |

HALF RATE CODED MODULATION SCHEMES FOR RAYLEIGH FADING CHANNELS

BACKGROUND OF THE INVENTION (a) Field of the Invention

The present invention relates generally to coding schemes for communication systems and, more particularly, to half rate block coded modulation schemes for use in Rayleigh fading channels.

(b) Description of Related Art

Hamming distance and product distance are two well known metrics used to measure the "separation" of communication symbols. In general, the amount of separation corresponds to the ease with which communication symbols will be confused. The Hamming distance represents the number of symbols that are different between two code words. For example, the Hamming distance between binary code words 010 and 101 is three, and the Hamming distances between 010 and 000 is one. The greater the Hamming distance between two code words the less likely that the code words will be confused.

Euclidean distance is the measurement of the separation between transmitted code words in a communication system. Specifically, it is the measure of the distance between two symbols on the communication code bit map. In a 8 phase shift keying communication system, for example, if a carrier phase of 0 represents the code word 001 and a carrier phase of 180 represents code word 011, the code words have maximum Euclidean distance. Conversely, if the code word 001 is represented by a word 011, the code words have maximum Euclidean distance. Conversely, if the code word 001 is represented by a phase of 0°, and the code word is 100 is represented by a phase of 45°, the Euclidean distance is a minimum.

Two typical communication channel models are Gaussian and Rayleigh channels. A Gaussian channel is modeled as a channel having an additive noise factor. In a Gaussian channel the power received is essentially the power transmitted reduced by a distance attenuation factor and a noise power component. When attempting to send information through a Gaussian channel it is useful to maximize the Euclidean distance between code words to alleviate confusion between the transmitted phases. However, it is not particularly helpful to maximize Hamming distance because signal power is usually adequate to determine the information contained in the phase of the transmitted signal.

A Rayleigh communication channel is characterized as a fast fading channel having multipath communication components that interact constructively and destructively. The multipath components can cause the power received to decrease to zero. Since receive power can drop out completely in a Rayleigh channel, Euclidean distance is not critical because the underlying principle behind Euclidean distance is the elimination of the confusion between the phases of the various received signals. In a Rayleigh channel the signal may not even be present. Therefore, the Hamming distance is critical to system operation. If the Hamming distance between two signals is large, even partial loss of the received signal may not inhibit the determination of the transmitted code word.

The Rayleigh channel model is commonly used when designing a mobile communications system such as cellular or wireless local network systems. A known coding scheme developed to function in a Rayleigh channel is the trellis coding modulation scheme. Trellis coding has three main features. First, trellis coding provides additional points in the communications constellation for redundancy and forward error correction. Second, trellis coding uses convolutional coding to introduce dependency between successive signal points, such that only certain signal patterns are permitted in the system. Third, soft decision coding is performed at the receiver in which the permissible sequence of signals is modeled as a trellis structure. Trellis coding has the disadvantage of being computationally intensive and, therefore, slow and occasionally difficult to implement in systems not having large computational capacity.

Thus, it would be desirable to have a coding scheme for use in a Rayleigh channel that is fast, computationally simple, and can be easily implemented.

SUMMARY OF THE INVENTION

A method of code construction is disclosed, the method includes the steps of creating a look-up table comprising 8 groups numbered 0–7 and 8 rows numbered 0–7, the intersection of a group and a row referred to as a cell, each cell in said look-up table having 4 columns; filling the first column of every cell in said look-up table with the number of the group in which the cell is located; filling the second column of every cell in said look-up table with the number of the row in which the cell is located. The method further includes the steps of sequentially choosing symbols 135° apart for 8-PSK, resulting in maximum Euclidean distance for column three. The method then performs the function of copying the contents of column three in group 0 to column three in all other groups, such that column three of all cells in a row are the same; shifting the contents of column three for all rows in a group, up a number of rows equal to the group number, such that as contents move from row 0 they move to row 7.

The symbols for column four are created by calculating a symbol having optimum Euclidean distance for column four of a cell in group zero and placing said symbol in column four of said cell, this process is repeated until column four of all cells in group zero have been filled; copying the contents of column four in group 0 to column four in all other groups, such that column four of all cells in a row are the same; shifting the contents of column four for all rows in groups one, two, and three, down by two, five, and six rows, respectively, such that as contents move from row 7 they move to row 0; and shifting the contents of column four for all rows in groups five, six, and seven, down by one, seven, and three rows, respectively, such that as contents move from row 7 they move to row 0.

In alternate embodiment, a code for use over GF(16) may be created by the following steps: creating a look-up table comprising 16 groups numbered 0–15 and 16 rows numbered 0–15, the intersection of a group and a row referred to as a cell, each cell in said look-up table having 4 columns; filling the first column of every cell in said look-up table with the number of the group in which the cell is located; filling the second column of every cell in said look-up table with the number of the row in which the cell is located; calculating a symbol having maximum Euclidean distance for column three of a cell in group zero and placing said symbol in column three of said cell, and repeating this process until column three of all cells in group zero have been filled; copying the contents of column three in group 0 to column three in all other groups, such that column three of all cells in a row are the same; and shifting the contents of column three for all rows in a group, up a number of rows equal to the group number, such that as contents move from row 0 they move to row 15.

Column four is completed by calculating a symbol having maximum Euclidean distance for column four of a cell in group zero and placing said symbol in column four of said cell and iterating until column four of all cells in group zero have been filled; copying the contents of column four in group 0 to column four in all other groups, such that column four of all cells in a row are the same; shifting the contents of column four for all rows in groups 1 to 7, down a number of rows equal to the group number, such that as contents move from row 15 they move to row 0; and shifting the contents of column four for all rows in groups 8 to 14, down a number of rows equal to the group number subtracted from 15, such that as contents move from row 15 they move to row 0.

The codes generated have four symbols that represent information to be sent, wherein the first two symbols are the information to be sent and the second two symbols are parity symbols, wherein the third and fourth symbols are chosen to have maximum Euclidean distance. The code symbols may be between either 0 and 7 or 0 and 15.

The invention itself, together with further objects and attendant advantages, will best be understood by reference to the following detailed description, taken in conjunction with the accompanying drawings.

BRIEF DESCRIPTION OF THE DRAWINGS

FIG. 3 is a look-up table containing the codes used by the encodes shown in FIG. 2;

FIG. 6 is a look-up table containing the codes used by the encoder shown in FIG. 5.

DESCRIPTION OF THE PREFERRED EMBODIMENTS

Figure 1:
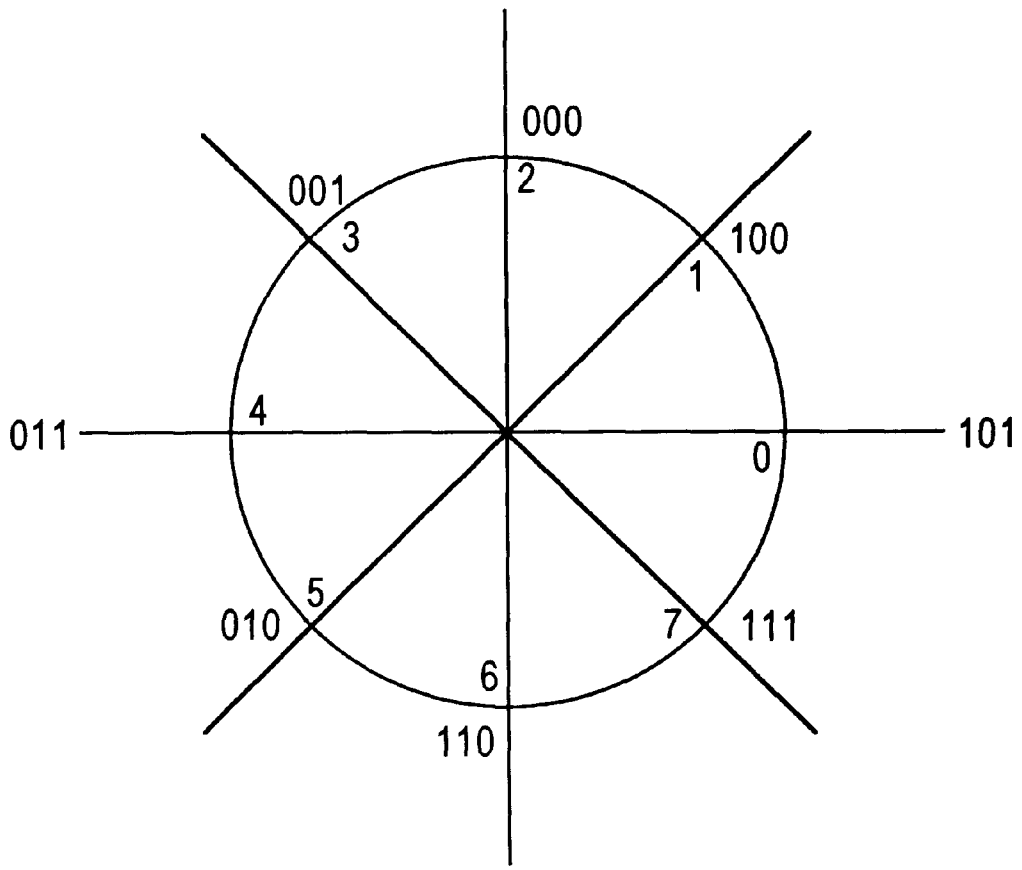
FIG. 1 is a graphical representation of a GF(8) signal space.

The present invention is a systematic (4,2) code that may be implemented in a 3-ARY phase shift keying (PSK) system over GF(8). GF(8) is understood in the art to mean that three bits are transmitted per symbol (i.e., the largest number that may be transmitted is seven). FIG. 1 is a graphical representation of the signal space and representative codes of a 8-PSK system. This type of diagram is well understood in the art to represent the connection between carrier phase and transmitted information.

Figure 2:
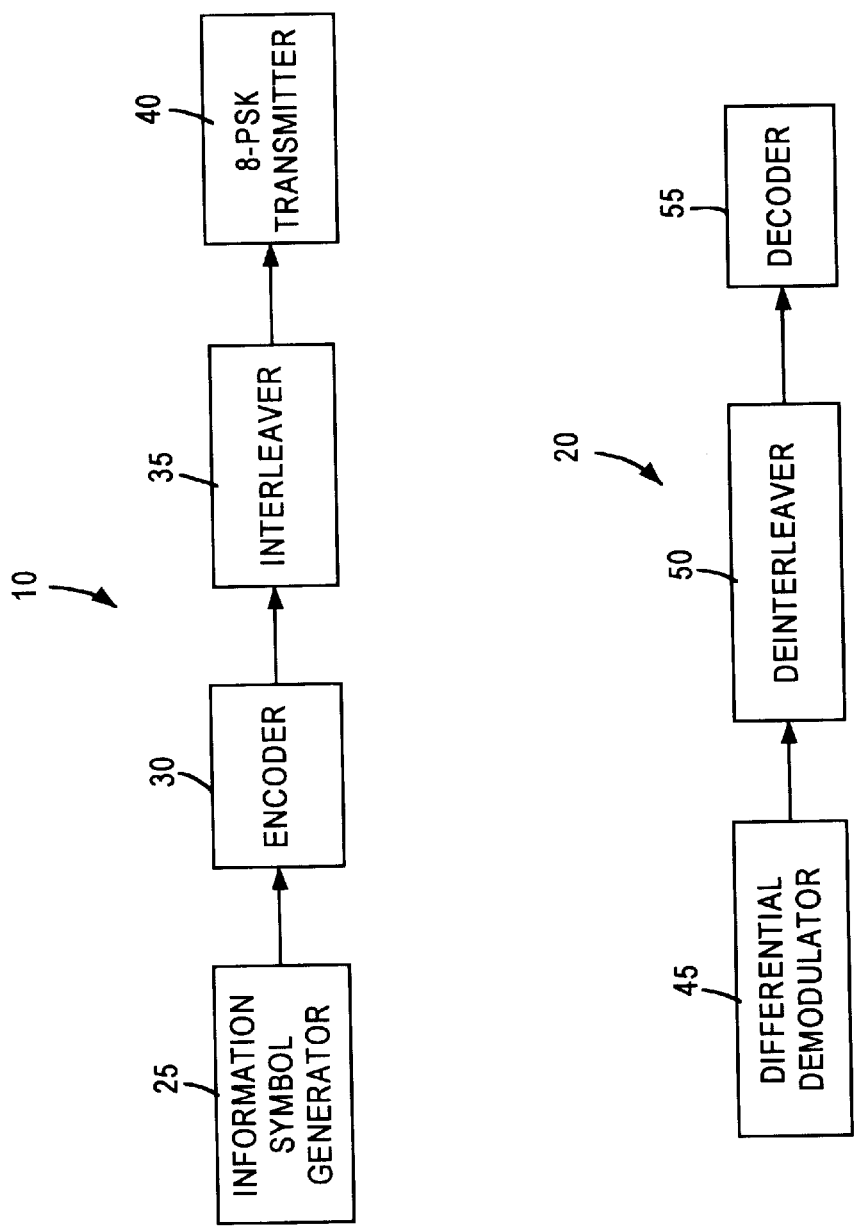
FIG. 2 is a representation of a QPSK system using the present invention.

FIG. 2 is exemplary of a 8-PSK communication system employing the present invention. The communication system includes a transmission component 10 and a reception component 20. The transmission component 10 includes an information symbol generator 25, an encoder 30, an interleaver 35, and a PSK transmitter 40. The information symbol generator 25 produces symbols that are to be transmitted. The symbols may represent, for example, a digitally sampled version of a linear predictive modulated voice signal. Information bits representing the quantized voice signal are used as an address for the encoder 30, which looks up parity symbols that are appended to the information symbols before transmission. The interleaver 35 converts the information symbols and associated parity symbols into binary signals that are distributed amongst a number of transmission frames. The interleaved bits are coupled to the PSK transmitter 40. The PSK transmitter 40 performs the function of converting the binary information into a PSK signal for transmission as specified by the constellation shown in FIG. 1. The functions performed by blocks 30 and 35 may be software functions that are implemented by a digital signal processor (DSP) or any other suitable processing device.

A look-up table containing coding for transmission encoder 30 is shown in FIG. 3. The code shown in FIG. 3, along with the method of its construction, are the objects of the present invention. The table as shown in FIG. 3 is composed of 8 groups, each group having 8 rows. A cell represents a specific row of a specific group. Each cell has four columns representing four code symbols. The first two columns in each cell match the group and row location of the cell and are referred to as the information symbols. The second two columns of the cells are referred to as parity symbols. The symbols from the information symbol generator 25 are used to address the appropriate parity bits from FIG. 3. For example, if the information symbol generator 25 outputs the code 1 5, the encoder 30 uses 1 5 as an address to find the appropriate code to be transmitted. In this case, the encoder 30 finds the code 1 5 2 5 and couples a signal representative of that code to the interleaver 35. The PSK transmitter 40 converts each symbol into a 3 bit binary sequence and further converts the binary sequence into phase modulation signals.

Referring again to FIG. 2, the reception component 20 includes a differential demodulator 45, which processes the in-phase and quadrature components of the received signal to recover the transmitted information. The demodulator 45 processes the in-phase and quadrature components to yield a bitstream that is fed to a deinterleaver 50, which processes the received bit information to recover the information that was originally coupled to the interleaver 35 in the transmission component 10. The decoder 55 recovers the information from the received signals. The output of the decoder 55 may be coupled to a digital-to-analog converter (DAC) or, alternatively, may be coupled to another processor. The functions performed by blocks 50 and 55 may be performed by individual components or by a digital signal processor (DSP).

Figure 4:
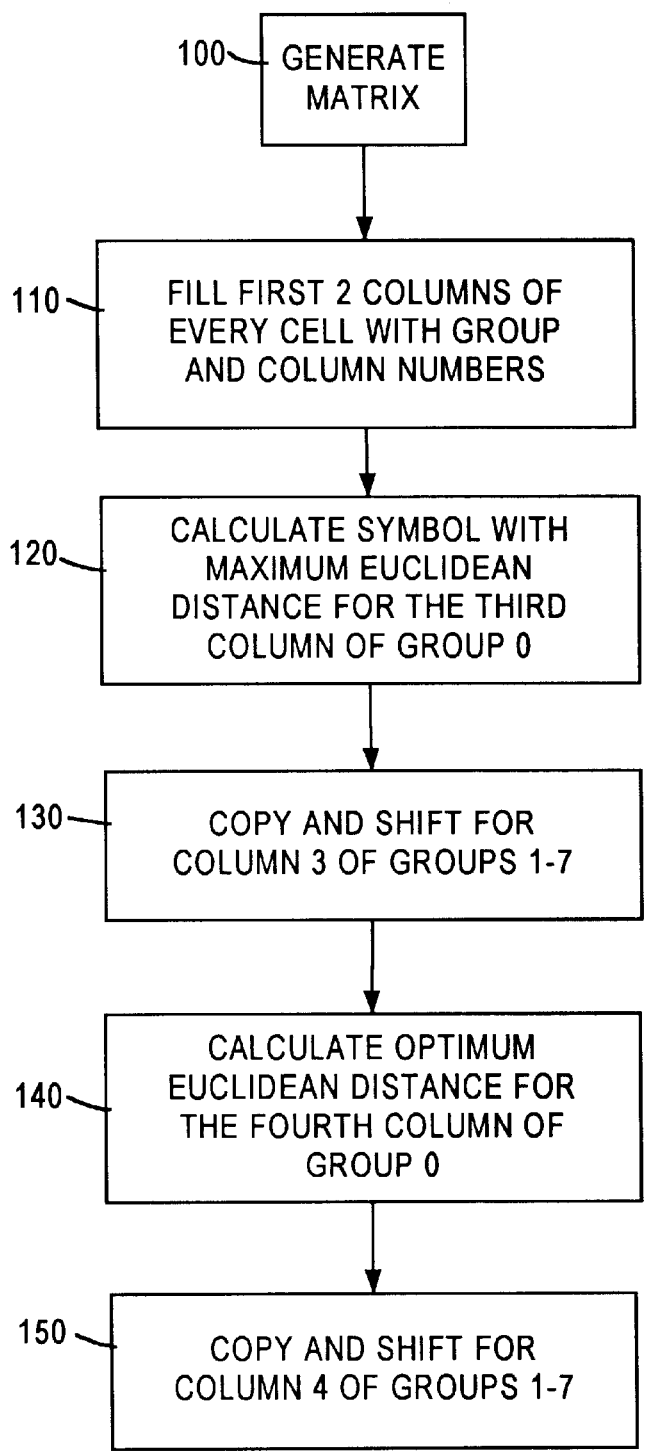
FIG. 4 is a flow diagram for generating codes according to the present invention for use with GF(8) system.

FIG. 4 is a flow diagram representing the method by which the parity symbols in FIG. 3 are generated. As shown in FIG. 4, a block 100 generates a matrix having eight rows and eight groups, and each cell of the matrix has four columns. As previously described, the first two columns in each group cell match the group and row position of each cell, and a block 110 performs the function of copying the row and group numbers into the cells.

A block 120 performs the function of calculating the maximum Euclidean distance for the third column in each cell of the group 0. After the symbols for column three of group 0 have been calculated and filled into the table shown in FIG. 3, a block 130 performs the function of filling in the column three in groups 1–7. This is completed using a two step process. First, the contents of column three of group 0 is copied into column three of all groups. The contents new of column three of groups 1–7 are then shifted up by the number of rows equal to the group number. For example, the contents of column three of group 2 are all shifted up two rows compared to the contents of column three group 0. The cell contents that wrap over the top of the table are moved to the bottom of the table in the same group and column.

A block 140 calculates symbols with optimum Euclidean distance for the fourth column in group 0. A block 150 copies the contents of the fourth column of group 0 into the fourth column of all groups. After the contents have been copied, the fourth column of groups 1, 2, and 3 are shifted down two, five, and six rows, respectively. Cell information from the bottom of the table is transferred to the top of the table. The fourth column of groups 5, 6, and 7 are shifted down by 1, 7, and 3 rows, respectively.

The probability of error in a communication system may be modeled by Equation (1), where $P_E$ (a,c) is the error probability, L' is the Hamming distance, $\Gamma$ is the average signal-to-noise ratio (SNR), $d_0^2$(a,c) is the Euclidean distance, and pd is the product distance, which may be represented by Equation(2).

$$P_E(a, c) = \frac{1}{pd \cdot \Gamma^L} \quad (1)$$

$$pd = [d_o^2(a, c)]^L = \left[L \sqrt{\prod_{k=1, d_k^2 \neq 0}^{L} d_k^2(a, c)}\right]^L = \prod_{k=1, d_k^2 \neq 0}^{L} d_k^2(a, c) \quad (2)$$

For a high SNR the dominating term of Equation (1) is the Hamming distance or the branch diversity. However, at low SNR both product distance and branch diversity become important. Branch diversity is defined as the number of different symbols between two code words. An optimal solution was obtained which yielded a branch diversity of at least two between two groups and at least three between all other groups.

In an alternative embodiment, this coding scheme may be used over a larger symbols space such as GF(16), which uses four bits per symbol (16-ARY PSK). A further modification could be the use of a quadrature-quadrature phase shift keying (QQPSK) modulation scheme, which is known in the art.

Figure 5:
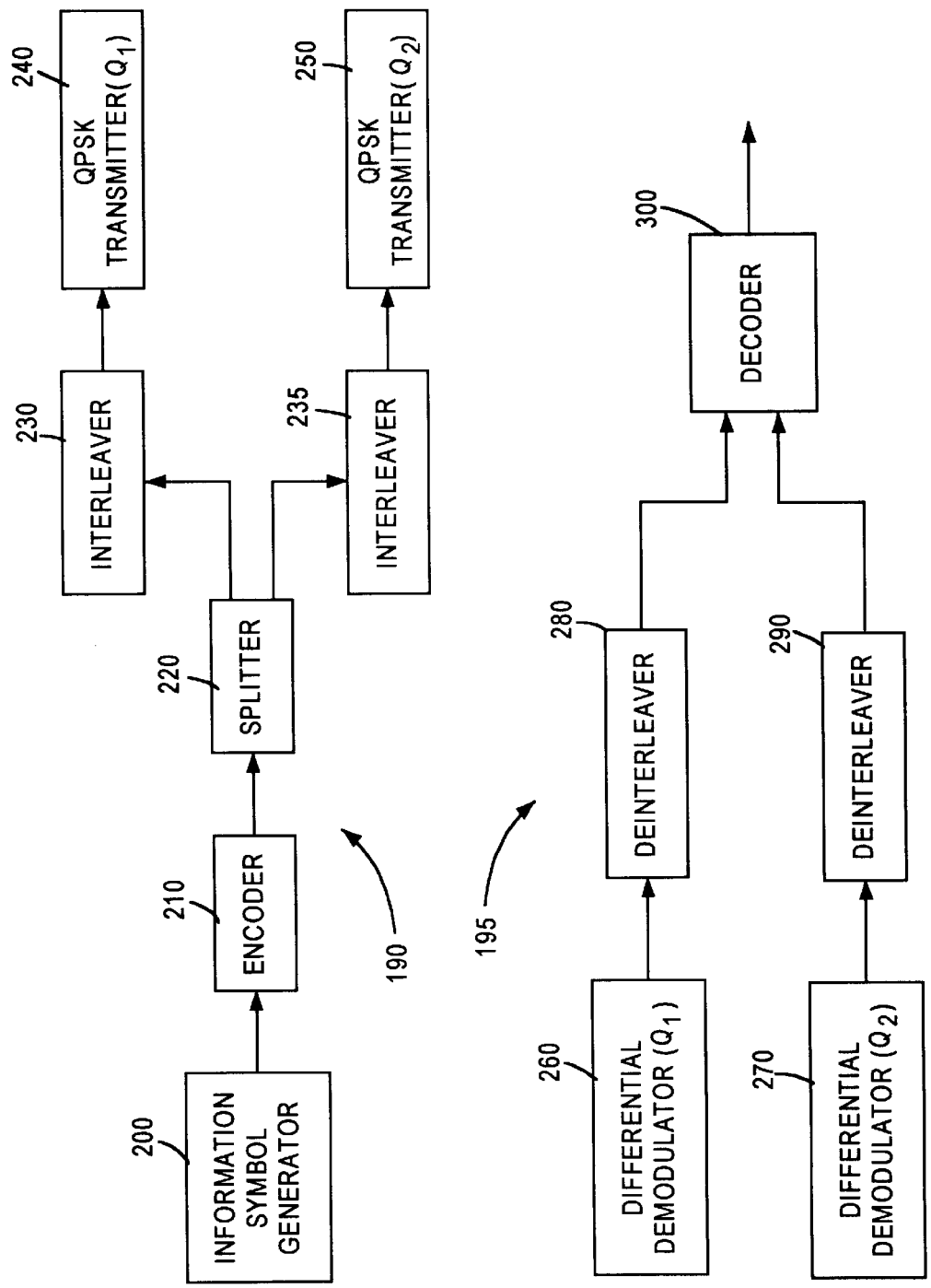
FIG. 5 is a representation of a QQPSK system using the present invention.

FIG. 5 is a representation of a QQPSK communication system employing the present invention. The communication system generally includes a transmission component 190 and a reception component 195. The transmission component 190 includes an information symbol generator 200, an encoder 210, a splitter 220, two interleavers 230, 235 and two QPSK transmitters 240, 250. Symbols from the information symbol generator 200 are passed to the encoder 210, which uses the information symbols to address a look-up table (FIG. 6) to find the appropriate parity symbols. The encoder 210 passes the information symbols along with the parity symbols to the splitter 230, which performs the function of splitting the signals from the encoder 210 into two separate signals which are coupled to two interleavers 230, 235, which interleave the symbols among a number of transmission frames. The outputs of the interleavers 230, 235 are coupled to two QPSK transmitters 240, 250. The QPSK transmitters 240, 250 use the signals from the interleavers 230, 235 to modulate carrier waves to the appropriate phases to transmit the required information.

The reception component 195 includes two differential demodulators 260, 270, two interleavers 280, 290, and a decoder 300. The differential demodulators 260, 270 receive information signals from the QPSK transmitters 240, 250. After the information has been demodulated the signals are passed to deinterleavers 280, 290, which reassemble the received data from numerous transmission frames into a sequence of signals identical to those fed to interleavers 230, 235. Information from the deinterleavers 280, 290 is fed to the decoder 300 which recovers the information from the received signals. The output of the decoder 300 may be coupled to digital-to-analog convertor (DAC), or alternatively, may be coupled to another processor.

Figure 7:
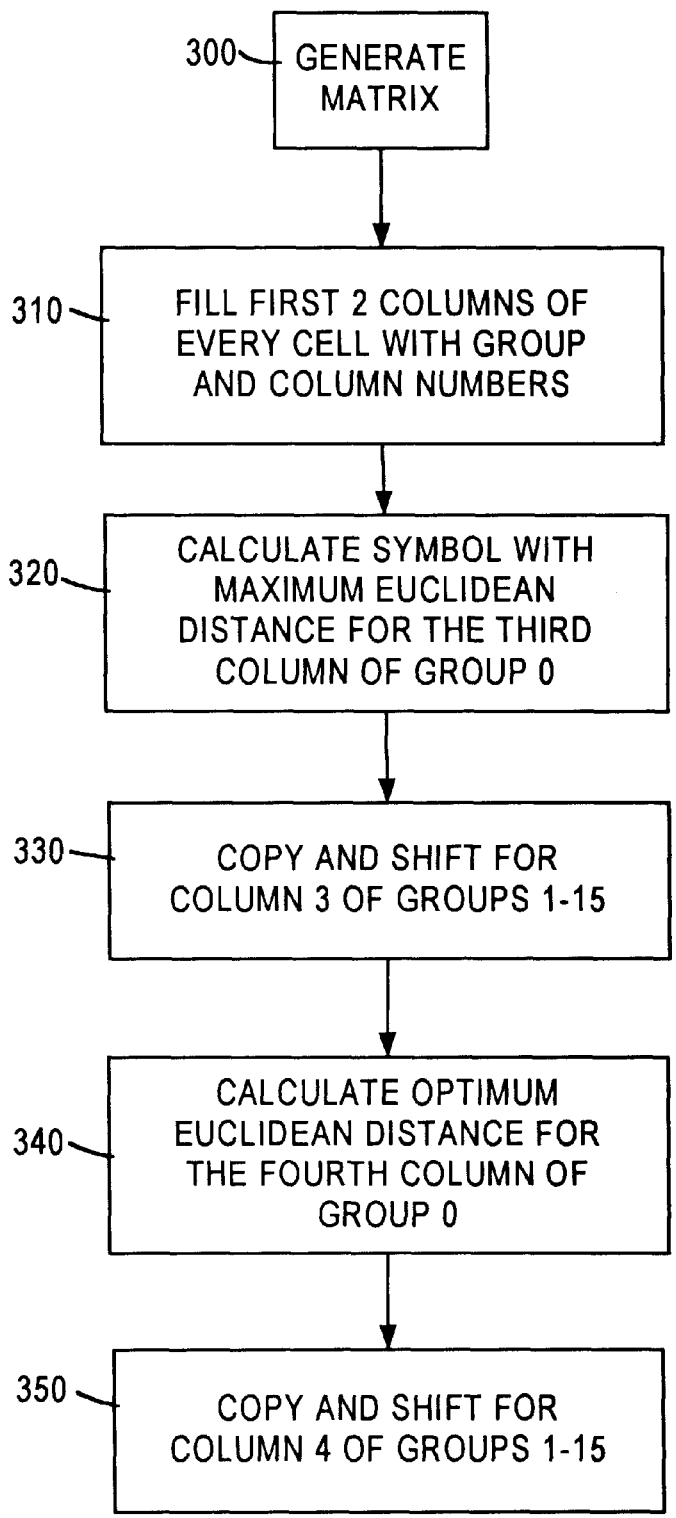
FIG. 7 is a flow diagram for generating codes according to the present invention for use with a GF(16) system.

Turning now to FIG. 7, a block 300 generates a matrix having fifteen rows and fifteen groups, each group having four columns. The first two columns in each group cell match the group and row position of each cell, and a block 310 performs the function of copying the row and group numbers into the cells.

A block 320 performs the function of calculating the maximum Euclidean distance for the third column in each cell of the group 0. As previously described, the probability of error in a communication system may be modeled by Equations (1) and(2).

After the symbols for column three of group 0 have been calculated and filled into the look-up table, a block 330 performs the function of filling in column three in groups 1–15. This is completed using a two step process. First, the contents of location three of column 0 are copied into column three of all other groups. The new contents of column three of groups 1–15 are then shifted up by the number of rows equal to the group number. The cell contents that wrap over the top of the table are moved to the bottom of the table in the same group and column.

A block 340 calculates symbols with maximum Euclidean distance for the fourth column in group 0, this is accomplished using equations (1) and (2). A block 150 copies the contents of the fourth column of group 0 into the fourth column of groups 1 to 5. The contents of column four of groups 1 to 7 are then shifted down by the number of rows equal to the group number. The cell contents that wrap over the bottom of the table are moved to the top of the table in the same group and column. the fourth column of groups 5, 6, and 7 are shifted down by a number of rows equal to the group number subtracted from 15.

The present invention is a systematic code and a method of construction therefor. As disclosed the code may be implemented in PSK systems over GF(8) or GF(16). The code provides good performance in Rayleigh fading channels. The code and method of construction are computationally efficient and simple to implement.

Of course, it should be understood that a range of changes and modifications can be made to the preferred embodiment described above. For example, the codes may be extended to other GF fields and the rate of the code could be other than ½. It is therefore intended that the foregoing detailed description be regarded as illustrative rather than limiting and that it be understood that it is the following claims, including all equivalents, which are intended to define the scope of this invention.

What is claimed is:

1. A method of constructing a communication code, the steps comprising:

(a) creating a look-up table comprising 8 groups numbered 0–7 and 8 rows numbered 0–7, the intersection of a group and a row referred to as a cell, each cell in said look-up table having 4 columns;

(b) filling the first column of every cell in said look-up table with the number of the group in which the cell is located;

(c) filling the second column of every cell in said look-up table with the number of the row in which the cell is located;

(d) calculating a symbol having maximum Euclidean distance for column three of a cell in group zero and placing said symbol in column three of said cell;

(e) iterating (d) until column three of all cells in group zero have been filled;

(f) copying the contents of column three in group 0 to column three in all other groups, such that column three of all cells in a row are the same;

(g) shifting the contents of column three for all rows in a group, up a number of rows equal to the group number, such that as contents move from row 0 they more to row 7;

(h) calculating a symbol having maximum Euclidean distance for column four of a cell in group zero and placing said symbol in column four of said cell;

(i) iterating (h) until column four of all cells in group zero have been filled;

(j) copying the contents of column four in group 0 to column four in all other groups, such that column four of all cells in a row are the same;

(k) shifting the contents of column four for all rows in a groups one, two, and three, down by two, five, and six rows, respectively, such that as contents move from row 7 they move to row 0;

(l) shifting the contents of column four for all rows in a groups five, six, and seven, down by one, seven, and three rows, respectively, such that as contents move from row 7 they move to row 0.

2. A method of constructing a communication code, the steps comprising:

(a) creating a look-up table comprising 16 groups numbered 0–15 and 16 rows numbered 0–15, the intersection of a group and a row referred to as a cell, each cell in said look-up table having 4 columns;

(b) filling the first column of every cell in said look-up table with the number of the group in which the cell is located;

(c) filling the second column of every cell in said look-up table with the number of the row in which the cell is located;

(d) calculating a symbol having maximum Euclidean distance for column three of a cell in group zero and placing said symbol in column three of said cell;

(e) iterating (d) until column three of all cells in group zero have been filled;

(f) copying the contents of column three in group 0 to column three in all other groups, such that column three of all cells in a row are the same;

(g) shifting the contents of column three for all rows in a group, up a number of rows equal to the group number, such that as contents move from row 0 they move to row 15;

(h) calculating a symbol having maximum Euclidean distance for column four of a cell in group zero and placing said symbol in column four of said cell;

(i) iterating (h) until column four of all cells in group zero have been filled;

(j) copying the contents of column four in group 0 to column four in all other groups, such that column four of all cells in a row are the same;

(k) shifting the contents of column four for all rows in groups 1 to 7, down a number of rows equal to the group number, such that as contents move from row 15 they move to row 0;

(l) shifting the contents of column four for all rows in groups 8 to 14, down a number of rows equal to the group number subtracted from 15, such that as contents move from row 15 they move to row 0.

3. A set of communication codes comprising:

four symbols that represent information to be sent, wherein the first two symbols are the information to be sent and the second two symbols are parity symbols, wherein the third and fourth symbols are chosen to have maximum Euclidean distance.

4. The code of claim 3, wherein said symbols may have values between 0 and 7.

5. The code of claim 3, wherein said symbols may have values between 0 and 15.

* * * * *